APPARATUS FOR MOULDING GRAMOPHONE RECORDS

Filed June 16, 1967 3 Sheets-Sheet 2

APPARATUS FOR MOULDING GRAMOPHONE RECORDS

APPARATUS FOR MOULDING GRAMOPHONE RECORDS

Filed June 16, 1967 3 Sheets-Sheet 3

United States Patent Office 3,543,331

Patented Dec. 1, 1970

3,543,331

APPARATUS FOR MOULDING GRAMOPHONE RECORDS

Walter Leslie Rand, Dale Side, Gerrard's Cross, Buckinghamshire, and Colin James Brown, West Ealing, London, England, assignors to Electric & Musical Industries Limited, Hayes, England, a company of Great Britain Filed June 16, 1967, Ser. No. 646,576
Claims priority, application Great Britain, June 24, 1966, 28,258/66
Int. Cl. B29d *17/00*
U.S. Cl. 18—5.3 4 Claims

ABSTRACT OF THE DISCLOSURE

Apparatus for moulding thermoplastics material such as a gramophone record press wherein aperture forming means has associated therewith a key so arranged that any residue from the aperture is held captive by the press when the moulded article is removed. The residue may be incorporated into a subsequent record.

Figure 2:
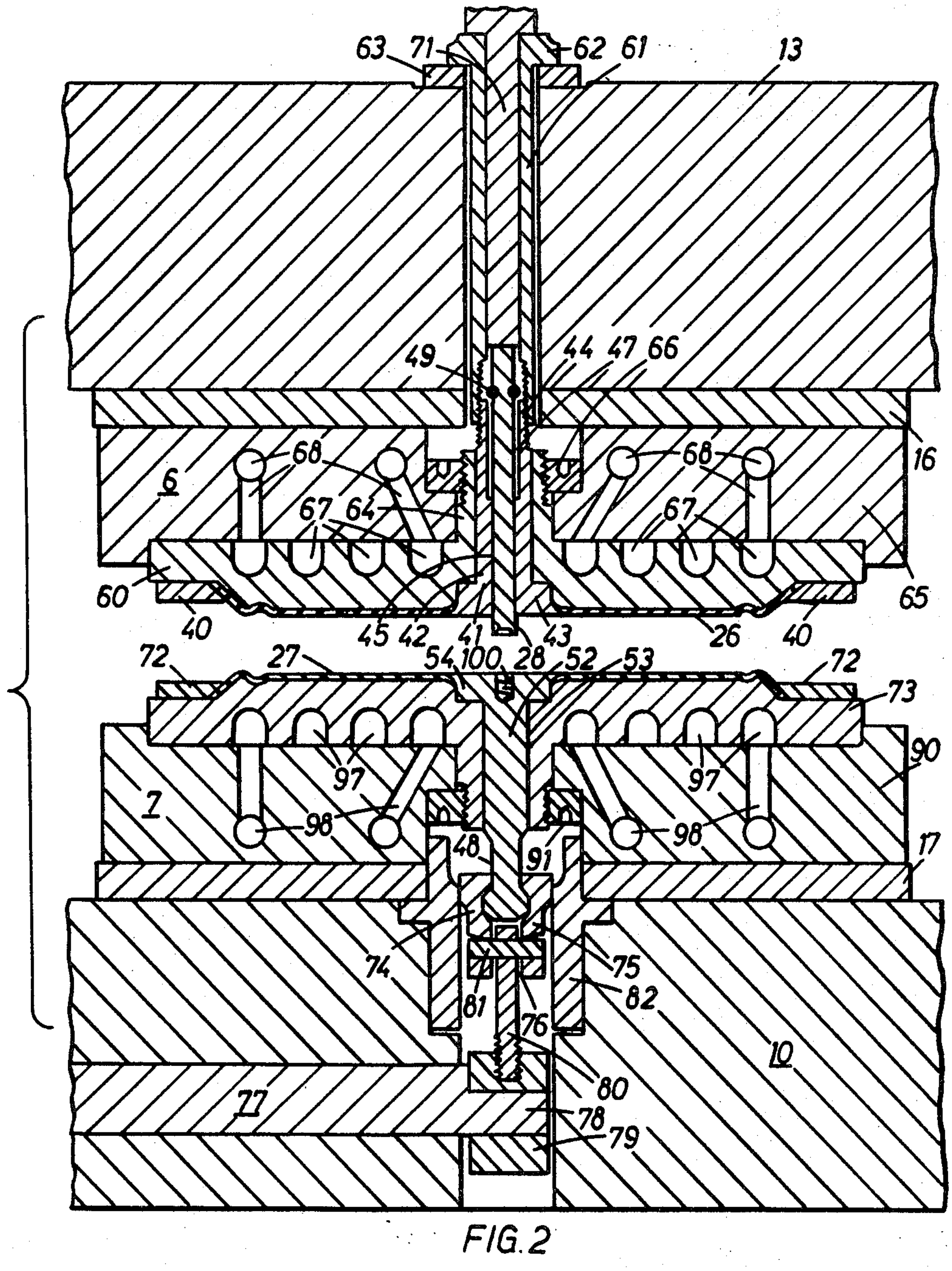

This invention relates to apparatus for moulding gramophone records.

In gramophone record presses, the record moulds are attached to the upper and lower platens of the press by means which include top and bottom centre members. These members retain the centres of the matrices in contact with the supporting mould blocks. The centre members have central bores into which pins are inserted. The mouldable material, from which a record is to be made together with a label for each side of the record, is placed between the upper and lower record moulds which latter are then urged together thus pressing the record. As the record is being pressed, the central pins are also urged together. The end of one pin is provided with a concave recess with raised surrounds forming a knife like element, which cuts out the centre hole of the record as it closes on an anvil like opposing surface at the end of the other pin.

It has been found that with this arrangement, the residual "slug" of material which has to be removed to form the centre hole of the record, may only be partly severed so that it remains attached to the record when the record is removed from the press. If the press is manually operated, the operator on removing the record from the press, places it on the spindle of an edge trimming machine, and the central slug is then pushed out and can be brushed away by the operator. The failure, in this case, to separate the centre slug in the press is not too serious a disadvantage, although it is inconvenient. If, however, the press is included in a system for automatically producing the finished record without manual intervention, the adherence of the slug to the record is disadvantageous since it tends to interfere with later automatic operations. A similar disadvantage arises in moulding other articles with apertures therein.

In accordance with the present invention there is provided gramophone record manufacturing apparatus including moulding apparatus having a pair of moulding platens having an open and a closed position, means for opening and closing said platens, aperture forming means for forming the centre hole of the record during the moulding process, said aperture forming means including a cutting pin and anvil means co-operating therewith mounted at the centre of said platens respectively, means operable in timed relationship with the closure of the platens to close the pin on the anvil means and operable in timed relationship with the opening of the platens to separate the pin from the anvil means, said pin being formed around its end circumference with a cutting edge and the pin and the anvil means being shaped to form when the pin is closed on the anvil a cavity radially inwardly of the cutting edge to accommodate material cut from the record to form the centre hole, and a key formed on one of said anvil means and said pin to hold material which is accommodated in said cavity and to retain it when the anvil means and pin are separated.

The key may be a keyed recess which may take the form of a threaded bore or may be formed by milling or drilling a plurality of holes inclined to one another. The key may be provided in the hole cutting pin or in the opposing anvil like member.

Figure 1:
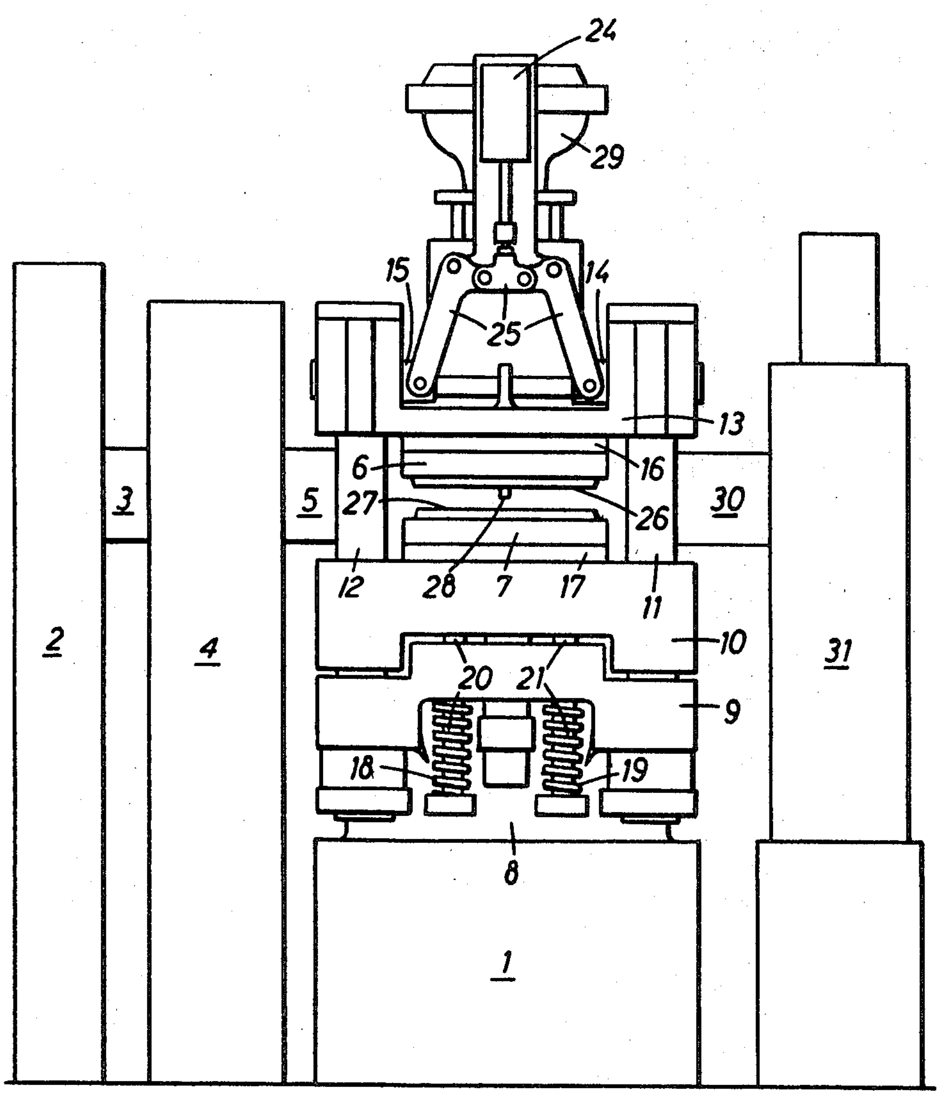
Figure 3:
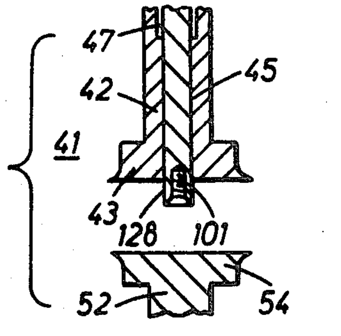
Figure 4:
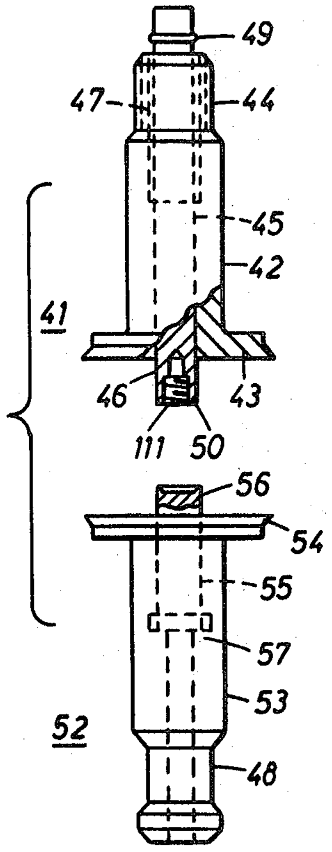
Figure 5:
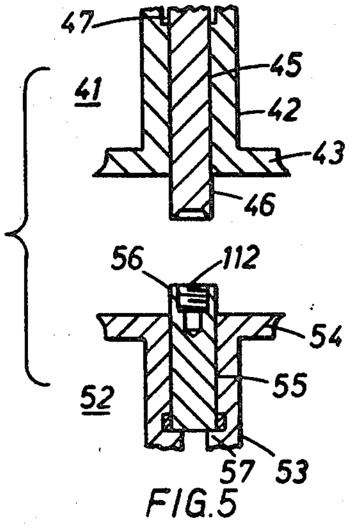
Figure 6:
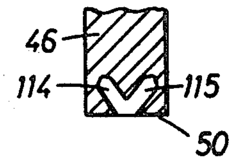
Figure 7:
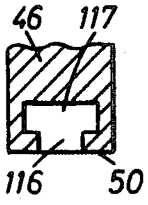
Figure 8:
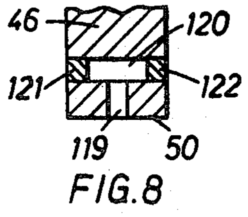

In order that the present invention may be clearly understood and readily carried into effect, it will now be described by way of example with reference to the accompanying drawings in which:

FIG. 1 is a schematic front elevation of an apparatus for automatically producing a finished record without manual intervention to which the invention may be applied, FIG. 2 is a vertical sectional view of part of a record press employing an embodiment of the invention, FIG. 3 shows in section a detail of the upper and lower centre members of FIG. 2 employing an alternative arrangement of the invention, FIG. 4 illustrates partly in section, an alternative form of the upper and lower centre members employing the invention suitable for use in the apparatus of FIG. 2, FIG. 5 shows, in section, a detail of the members shown in FIG. 4 employing an alternative arrangement of the invention, and FIGS. 6, 7 and 8 show in section, the end part of a centre pin using modified forms of the invention.

Automatic record producing apparatus to which the invention is applied will now be described with reference to FIGS. 1 and 2.

One general form which may be taken by apparatus for automatically producing gramophone records, is illustrated in frontal elevation in FIG. 1. The assembly includes a moulding press 1 in which a charge of mouldable material together with an upper and a lower label is formed into a record. The mouldable material is held in a container within the automatic charge former represented by the block 2. The material is dispensed in predetermined amounts into the jaws of automatic transfer means represented by the block 3, which transfers the charge of mouldable material automatically to an automatic labelling device represented by the block 4. The device 4 places a label automatically onto the upper and lower faces of the charge of mouldable material, which is then transferred automatically by automatic transfer means 5, into position between the mould block assemblies 6 and 7 of the press 1.

The operation of the press 1 is effected by means of a hydraulic ram the outer casing 8 of which is attached to the press bed 9. The piston, not shown, of the hydraulic ram 8 bears on a bolster 10, which is guided by guide posts 11 and 12, so that it may be urged by the ram 8 towards a leaf 13 attached to the flattened ends of the posts 11 and 12 by means of bolts 14, 15. In this way the upper and lower mould assemblies 6, 7 mounted on slipper plates 16, 17 on the facing surfaces of the leaf 13 and the bolster 10, are brought together to mould the charge of mouldable material, placed therebetween by transfer means 5, into the form of a gramophone record. The mould assemblies 6, 7 are heated for an appropriate period during the moulding operation by passing steam through channels formed in the mould blocks. The assemblies 6, 7 are cooled prior to the opening of the press by passing cold water through the same channels. The operation of the ram and of the heating and cooling cycles are controlled automatically by a preset sequencer in conventional manner as are the operations of the other units in the assembly.

When the ram 8 is disconnected from the hydraulic pressure supply by the sequencer, the bolster 10 is pulled downwards by means of springs 18, 19 acting between the underside of the press bed 9 and the end collars of rods 20, 21 attached at their upper extremities to the bolster 10, and which pass slidably through holes in the press bed 9. The leaf 13 is hinged at the back and counterbalanced so that, on releasing the bolts 14, 15 by means of a pneumatic actuating cylinder 24, acting via mechanical links 25, the leaf 13 may be raised to enable access to be gained to the mould block assemblies for the purpose of changing the pressing matrices 26, 27 and for maintenance.

During the pressing operation an aperture forming member in the form of a centre pin 28 with a cutting peripheral edge is urged against a co-operating anvil by means of a pneumatic actuating cylinder 29, acting via push rods, in order to form the centre hole of the record and it is to the improvement of the operation of this part of the press that this invention relates as will become apparent hereafter with reference to FIGS. 2 to 8.

When a record has been pressed in the press 1, a part of the mouldable material is exuded from the edge of the mould to form a surrounding flash which may be gripped by transfer means which may be of conventional form and are therefore represented by a block 30. When the moulding assemblies have been separated the record is transferred by means 30 to a flash remover which may take any convenient form and is therefore represented by a block 31. After the flash has been removed, the record may then be automatically transferred to a machine for automatically placing each record into a corresponding record sleeve ready for dispatch.

It will be understood that the items represented by blocks 2, 3, 4, 5, 30, 31 may be of any convenient form and the operation thereof will not be considered further.

A vertical section through the platens of the moulding press is shown in FIG. 2 to which reference will now be made. The upper record pressing matrix 26 is attached to the press by means of outer clamps 40 bolted to the matrix backing plate 60 and a centre member 41 comprising a shank 42 having a flange 43. The member 41 has a threaded end 44 and a hollow cylindrical member 61, having a hexagonal flange 62 at one end and an internal thread at the other end, is screwed over the end 44 to hold the centre member 41 in position. A washer 63 is inserted between the flange 62 and the upper surface of the leaf 13.

The upper surface of the matrix backing plate 60 is provided with a central hollow cylindrical projection 64 threaded at one end. The plate 60 is held against the mould block 65 by means of a ring nut 66. The slipper plate 16 is situated between the mould block 65 and the leaf 13. Channels 67 are formed in the back of the backing plate 60 and communicate with feed ducts 68 in the block 65 to allow steam or cold water to be circulated as appropriate during the moulding process. The pin 28 is a sliding fit in the centre bore of the member 41, the bore 45 having an enlarged upper part 47. A spring collar 49 is fitted in a groove near the upper end of the pin 28. Thus the pin can slide in the bore 45 only until the collar 49 strikes the top of the member 41. The lower end of the pin 28 is hollowed to form a cutting edge round the periphery. A rod 71 relays the thrust produced by the pneumatic cylinder 29, shown in FIG. 1, to the upper end of the pin 28. A small clearance is arranged between the lower end of the rod 71 and the upper end of the pin 28 when the shoulder portion of the rod 71 rests on the upper surface of the flange 62 and the pin 28 hangs freely, retained by the collar 49 when the press is fully open. In this way the thrust exerted by the pneumatic cylinder 29 is prevented from acting on the collar 49, and the collar 49 only serves to prevent the pin 28 from dropping out when the press 1 is opened.

The lower record pressing matrix 27 is attached to the press by means of outer clamps 72, bolted to the matrix backing plate 73, and a flanged centre member 52, comprising a shank 53 having a flange 54. The member 52 is formed with a groove 48 which co-operates with the jaws 74, 75 of a clamp 76. A shaft 77 is passed horizontally through the bolster 10, and an eccentric bearing 78 is formed at one end on which a collar 79, attached to the threaded end of a connecting rod 80, is free to rotate. The jaws 74, 75 are attached to the other end of the connecting rod 80 by means of a pin 81. The jaws 74, 75 are a sliding fit inside the smaller internal diameter region of the hollow flanged cylindrical member 82 which also has a region of larger internal diameter. The shaft 77 extends outside the bolster 10 to an operating lever, not shown, whereby the clamp may be made secure or released as required. The clamp 76 is shown in the secure position in FIG. 2. In order to release the clamp, the shaft 77 is turned until the bearing 78 is at the uppermost position. The upper, wider, portion of the jaws 74, 75 now rests in the region of larger inside diameter of the member 82 and are thus able to separate, releasing the grasp on the lower end of the centre member 52, which may be removed to allow the matrix 27 to be changed.

The plate 73 is attached, as in the case of the upper mould assembly 6, to a mould block 90 by means of a ring nut 91. The assembly 7 rests on the slipper plate 17, which is placed on the upper surface of the bolster 10 of the hydraulic ram 8 in FIG. 1. Channels 97, 98 are formed as before in the backing plate 73 and in the block 90 through which steam or cold water may be circulated at appropriate times during the moulding cycle.

The invention, as applied to the apparatus described above, consists of the formation of a keyed recess 100 in the surface of the member 52 in the region occupied by the residue of the moulding compound remaining in the centre hole of the moulded record as a result of the cutting action of the aperture forming cutting pin 28. The recess 100 is formed, in the embodiment of FIG. 2, by a hole drilled and tapped with a thread coarse enough to grip the residue so that it is not retained by the moulded record when the latter is removed from the press by the automatic transfer means 30.

In the operation of the press shown in FIG. 2 a charge of mouldable material with a record label attached to the upper and lower surfaces, is deposited by the automatic transfer means 5 centrally on the surface of the lower matrix 27. Steam is admitted to the ducts 67, 68, 97, 98 to heat the moulds. As soon as the transfer means has withdrawn, leaving the charge of material on the matrix, the ram 8 is operated causing the bolster 10 to rise. The pneumatic device 29 is also caused to operate, forcing the cutting edge of the aperture forming pin 28 downwards towards the anvil like upper surface of the flange 54 of the centre member 52. As the bolster 10 rises further causing the matrices 27 and 26 to meet at the outer edges thus pressing the mouldable material into the form of a record, the pin 28 will be pushed back by the upper surface of member 52 against the pneumatic pressure exerted by the device 29. The cutting edge of the pin 28 therefore cuts out the centre hole of the record. Since the upper surface of the flange 54 is formed with a tapped hole 100, some of the mouldable material forming the centre slug of the record is pushed into the hole 100 and, because of the thread, the slug remains firmly attached to the centre member 52 when the record material is cooled as cold water is circulated through the ducts 67, 68, 97, 98 prior to opening the press 1. When the press 1 is opened by releasing the hydraulic pressure on the ram 8, thus allowing the bolster 10 to be pulled downwards by the springs 18, 19, the record is held by clips on the transfer means 30, which are caused to grip the record flash after the press has cooled. The record is therefore pulled away from the matrix 27, but the slug is more firmly attached to the centre member 52 of the press than to the record and is therefore retained attached to the member 52 on removal of the record by the transfer means 30.

The adhesion of the slug to the centre member 52 is not disadvantageous since it becomes incorporated in the material for the next record when the temperature of the press is again raised to moulding temperature as the next record is pressed.

The keyed recess may be provided in the upper pressing assembly and this is illustrated in the detail section of FIG. 3 in which the parts, corresponding to parts shown in FIG. 2, are similarly numbered. In this alternative arrangement a vertical hole 101 is drilled within the cutting end of the centre forming pin 128 and the upper surface of the flange 54 is plane. In this form of the invention the slug is retained by the cutter pin 128 as the press is cooled and on reheating for the next record, the slug is converted into a mouldable state in which it is able to become incorporated in the material for the next record.

An alternative form of the centre members 41 and 52 is shown in FIG. 4. Again the same identifying numbers are used for parts which correspond to similar parts shown in FIG. 2. In the embodiment of FIG. 4, the shank 53 of the lower centre member 52 is formed with a bore 55 in which a pin 56 is fitted. The pin 56 is a press fit in the bore 55, its lower end being pressed against a shoulder 57. The other end of the pin 56 projects from the flange 54 and is hollowed to form a cutting edge round the periphery.

The upper centre member 41 has a central pin 46, operated in a manner similar to the pin 28 in FIG. 2 by the device 29, but having a threaded hole 111 formed in the end 50 thereof. The slug is retained by the keying of the hole 111 in the pin 46 when the press is cooled and opened.

The threaded hole 111 may be provided in the lower pin 56 instead of the upper pin as shown in the sectional detail of FIG. 5. Similar numbers are used to identify elements having similarities to those shown in FIG. 4. In this example a threaded hole 112 is formed in the upper end of the lower pin 56 and the lower end of the upper pin 46 is formed into a circumferential cutting edge. In this alternative the slug is retained by hole 112 in the pin 56 when the press is cooled and the record removed therefrom.

The keyed recesses 100, 101, 111 and 112 have been shown in the form of threaded holes, but other forms of keying may be employed as an alternative in any of the examples given. One other such form is shown in the sectional detail of FIG. 6. The effect of a key which allows the pin 46 to retain the slug is achieved by making at least two drillings 114, 115 into the end 50 of the pin 46 inclined one to another. In this way mouldable material forced into the holes 114, 115 during the molding process, solidifies on cooling the press, thus producing a form which cannot easily be withdrawn from the recess 114, 115 in the pin 46.

Another way of forming the keyed recess is illustrated in FIG. 7. A hole 116 is drilled in the end 50 of the pin 46 to the full depth of the recess and a suitable milling cutter is introduced to enlarge the portion 117 of the hole thus forming a key which will retain the slug of plastic material introduced into the recess 116, 117 by the operation of the press.

A further way of forming the keyed recess in the pin 46 is illustrated in the sectional detail of FIG. 8 in which a first hole 119 is drilled into the face 50 of the pin 46 while a second hole 120 is drilled across the pin 46 to intersect the first hole 119. The hole 120 is stopped at each end by plugs 121 and 122. It will be apparent that mouldable material from the slug will be held by the T shaped key so formed.

The embodiments shown in FIGS. 6, 7 and 8 may be applied equally well to the pin 56 of FIG. 5 or to the pin 128 of FIG. 3. The embodiments of FIGS. 6 and 7 may be readily applied to forming a keyed recess in the upper surface of the flange 54 of the lower centre member 52 shown in FIG. 2, however it may be difficult to apply the arrangement of FIG. 8 since the cross drilling 120 might be inconveniently long, although the hole 120 could be drilled in two or more parts inclined to one another.

A further method of forming a key to the part of the moulding apparatus that the unwanted slug is in contact with during the moulding process is to attach an anchoring projection to the mould surface at that point. Such a projection while forming a firm key with the unwanted slug should be dimensioned so that it does not impair the cutting action of the aperture forming member. One convenient form of projecting member would comprise a portion of springy wire or tape which is attached to the moulding surface and which would allow itself to be readily deformed by the aperture forming member while retaining a sufficient space between a portion of the springy member and the mould surface to allow some of the moulding material in the unwanted slug to be retained therebetween, thus forming a firm key to the slug as the press is cooled prior to opening.

Other methods of forming a key to the part of the moulding apparatus that the unwanted slug is in contact with during the moulding process, will become apparent to those skilled in the art and it is not intended that the scope of the claims should be limited only to the embodiments herein described since they are presented by way of example only.

Whereas the invention has been shown as applied to a particular form of automatic record press, the invention may be employed equally well in other forms of automatic press and may with advantage also be applied to a record press which is manually operated or semi-automatic.

The invention may be employed in the formation of other forms of aperture such for example as the slots required in records with removable centre pieces.

What we claim is:

1. Gramophone record manufacturing apparatus including moulding apparatus having a pair of moulding platens having an open and a closed position, means for opening and closing said platens, aperture forming means for forming the centre hole of the record during the moulding process, said aperture forming means including a cutting pin and anvil means co-operating therewith mounted at the centre of said platens respectively, means operable in timed relationship with the closure of the platens to close the pin on the anvil means and operable in timed relationship with the opening of the platens to separate the pin from the anvil means, said pin being formed around its end circumference with a cutting edge and the pin and the anvil means being shaped to form when the pin is closed on the anvil a cavity radically inwardly of the cutting edge to accommodate material cut from the record to form the centre hole, and a key formed on one of said anvil means and said pin to hold material which is accommodated in said cavity and to retain it when the anvil means and pin are separated.

2. Apparatus according to claim 1 wherein said key is in the form of a recess in said cavity.

3. Apparatus according to claim 2 wherein said keyed recess is in the form of a thread in said cavity.

4. Apparatus according to claim 1 wherein said cavity is formed partly in said pin and partly in said anvil means.

References Cited

UNITED STATES PATENTS

| | | |
|---|---|---|
| 941,291 | 11/1909 | Wicks. |
| 1,436,941 | 11/1922 | Burckard. |
| 1,573,769 | 2/1926 | Fletcher. |
| 1,576,642 | 3/1926 | Bishop. |
| 2,524,858 | 10/1950 | Thomas. |
| 2,839,306 | 6/1958 | Bayless. |
| 3,186,029 | 6/1965 | Joseph. |
| 3,298,059 | 1/1967 | Sakamoto. |
| 3,397,425 | 8/1968 | Phillipson et al. |

FOREIGN PATENTS

| | | |
|---|---|---|
| 1,059,447 | 11/1953 | France. |
| 651,725 | 10/1937 | Germany. |
| 306,265 | 2/1929 | Great Britian. |
| 547,291 | 8/1956 | Italy. |

J. HOWARD FLINT, Jr, Primary Examiner